United States Patent
Chen et al.

(10) Patent No.: US 6,697,923 B2
(45) Date of Patent: Feb. 24, 2004

(54) BUFFER MANAGEMENT METHOD AND A CONTROLLER THEREOF

(75) Inventors: Jen-Kai Chen, Taipei (TW); ChaoCheng Cheng, Taipei (TW); Yeong-Chian Hu, Taipei (TW)

(73) Assignee: Via Technologies Inc., Taipei (TW)

( * ) Notice: Subject to any disclaimer, the term of this patent is extended or adjusted under 35 U.S.C. 154(b) by 175 days.

(21) Appl. No.: 09/987,499

(22) Filed: Nov. 15, 2001

(65) Prior Publication Data

US 2003/0093629 A1 May 15, 2003

(30) Foreign Application Priority Data

Jun. 5, 2001 (TW) ........................................ 90113538 A

(51) Int. Cl.[7] .............................................. G06F 12/00
(52) U.S. Cl. ...................................................... 711/154
(58) Field of Search ................................ 711/170, 171, 711/172, 173, 154, 216, 217, 218, 220, 221

(56) References Cited

U.S. PATENT DOCUMENTS 5,301,288 A * 4/1994 Newman et al. ............ 711/202
5,978,893 A * 11/1999 Bakshi et al. ................ 711/171

* cited by examiner

Primary Examiner—Hiep T. Nguyen
(74) Attorney, Agent, or Firm—Rosenberg, Klein & Lee

(57) ABSTRACT

A method for buffer management and a controller of the same are disclosed. In the buffer management method, a first control mode is performed, and a plurality of bits are used to control a bit mask region of a memory. A second control mode is performed, and a plurality of unused addresses in a link region of the memory is cached. A third control mode is performed, to control a plurality of second unused addresses in the link region by a linked list. The controller comprises a plurality of bits for controlling a bit mask region; a plurality of address cache units for caching a plurality of first unused address of a linked list in a link region; and a pointer for always pointing to a head of the linked list in the link region, wherein the linked list links a plurality of second unused addresses.

19 Claims, 6 Drawing Sheets

BUFFER MANAGEMENT METHOD AND A CONTROLLER THEREOF

FIELD OF THE INVENTION

The present invention relates to a method for buffer management and a controller of the same for improving the efficiency of buffer management, and especially to a data accessing method for managing a buffer by a buffer controller.

BACKGROUND OF THE INVENTION

A buffer is provided for a controller and a connected device for buffering and management while accessing data. Referring to FIG. 1, a general block schematic view of a buffer and a processor is illustrated. As shown in the FIG. 1, a buffer controller 20 is provided between a processor 10 and a buffer memory 30. The buffer memory 30 can be synchronous dynamic random access memory (SDRAM) or static random access memory (SRAM). The buffer controller 20 controls the data accessing between the processor 10 and the buffer memory 30. Referring to FIG. 2, a schematic view of a prior art buffer management by bit mask. As shown in the figure, the buffer controller 20 is installed with a bit masker 202 for recording the use of the segments 30.0001 to 30.2048 in the buffer memory 30, namely the bit masker is installed with 2048 bits corresponding to the segments 30.0001 to 30.2048 in the buffer memory 30. Therefore, as the processor 10 processes data, the system can real-time allocate the required memory for the processor 10 according to the bit mask status of the bit masker 202 from the buffer controller 20. The physical memory size required by the bit masker 202 is very large and thus cost a lot. As a result, it can not match the requirement in the industry.

Another way for managing the buffer is by a linked list. Referring to FIG. 3, a schematic view for the prior art buffer management using a linked list is illustrated. In initialization, as shown in the figure, the segments 30.0001 to 30.2048 in the buffer memory 30 are serially linked. Furthermore, the segment 30.0001 has a tail node pointing to the 30.0002 and the tail of the segment 30,0002 points to the segment 30.0003. The processes repeats continuously until the segment 30.2048 is pointed and linked, while the segment 30.2048 is pointed to null. Null represents an end of the free linked list. The buffer controller 20 is installed with a pointer 204 for recording a first unused segment, i.e. the head of the free linked list. Initially, as the first unused segment has an address 30.0001, the pointer points to the segment 30.0001. If the segment 30.0001 is stored with data, the pointer is necessary to read the tail node of the segment 30.0001 for updating its content and then point to the segment 30.0002. Later, if the content of the segment 30.0001 is processed and the segment 30.0001 needs to be freed back to the free linked list. The buffer controller 20 frees the segment 30.0001 to the head of the free linked list. Namely, the tail node of the segment 30.0001 must be updated to point to the new head of the free segments originally recorded in the pointer 204. Then the pointer 204 points to the segment 30.0001 so as to complete the linkage. Therefore, although it is only purely to assign and free one segment in the buffer memory, it involves a complex hardware operation. Although, applying the linked list can save a lot of bit mask memory and the cost is reduced. The efficiency is low and the loading of the static random access memory is high due to the frequent access. This does not match the requirement of the industry.

Therefore, there is a need for a method for buffer management and a controller of the same to resolve the prior art problems.

SUMMARY OF THE INVENTION

Accordingly, the primary object of the present invention is to provide a method for buffer management for improving the efficiency of buffer management and a controller thereof. In the buffer management method, a first control mode is performed, wherein a plurality of bits are used to control a bit mask region of a memory. A second control mode is performed, and a plurality of unused addresses in a link region in the memory is cached. A third control mode is performed, to control a plurality of second unused addresses in the link region by a linked list.

The present invention further provides a controller comprising a plurality of bits for controlling the utilization status of a bit mask region; a plurality of address cache units for caching a plurality of first unused address in the link region; and a pointer for pointing to a head of a linked list in a link region of the memory, and the linked list links a plurality of second unused addresses.

The various objects and advantages of the present invention will be more readily understood from the following detailed description when read in conjunction with the appended drawing.

DETAILED DESCRIPTION OF THE PREFERRED EMBODIMENTS

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
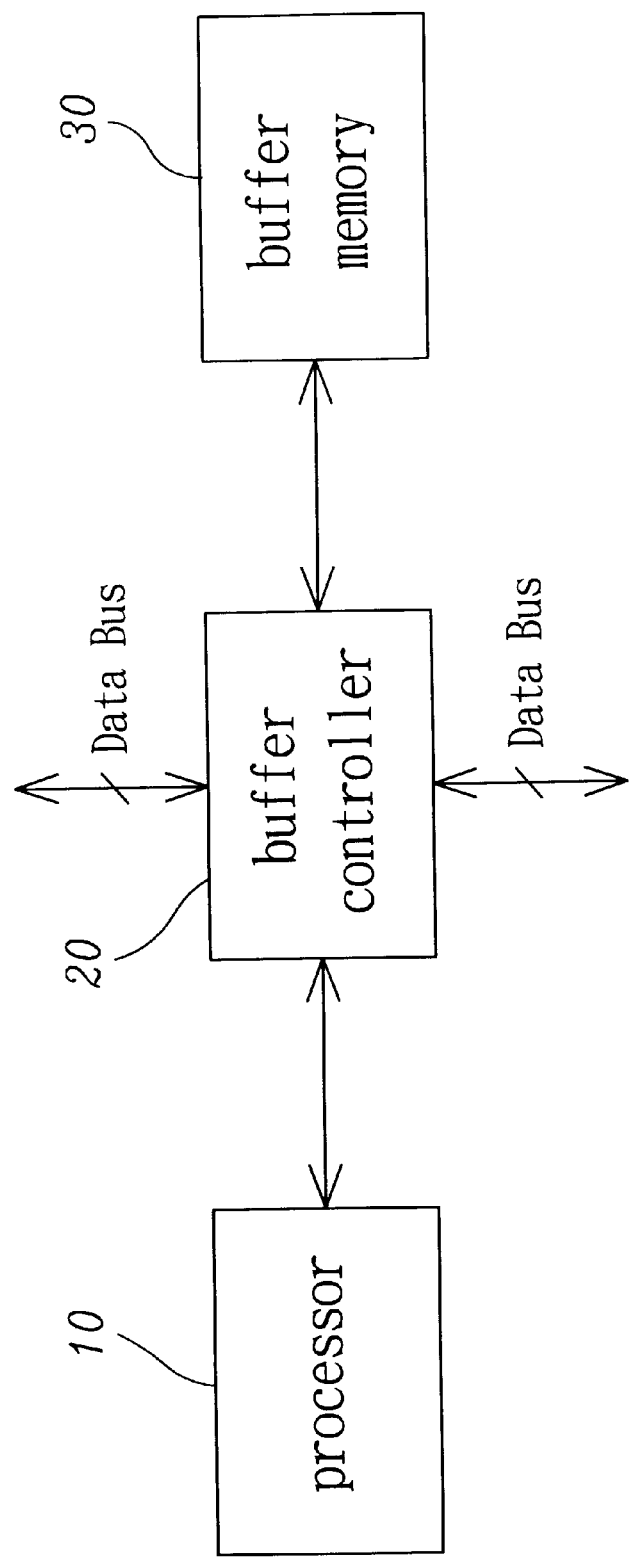
FIG. 1 is a conventional structural schematic view showing the linked list of a general buffer and a controller.
Figure 2:
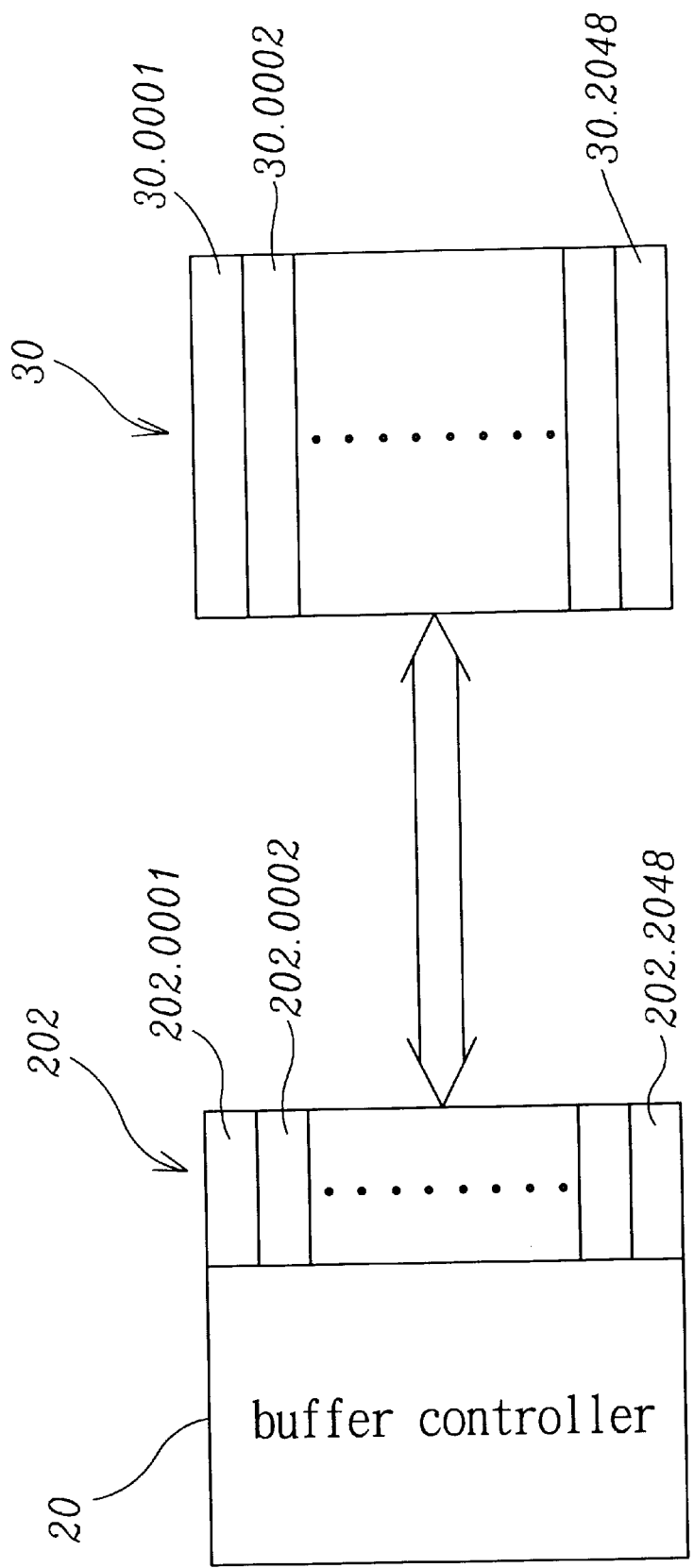
FIG. 2 is a conventional schematic view showing the buffer management using bit mask.
Figure 3:
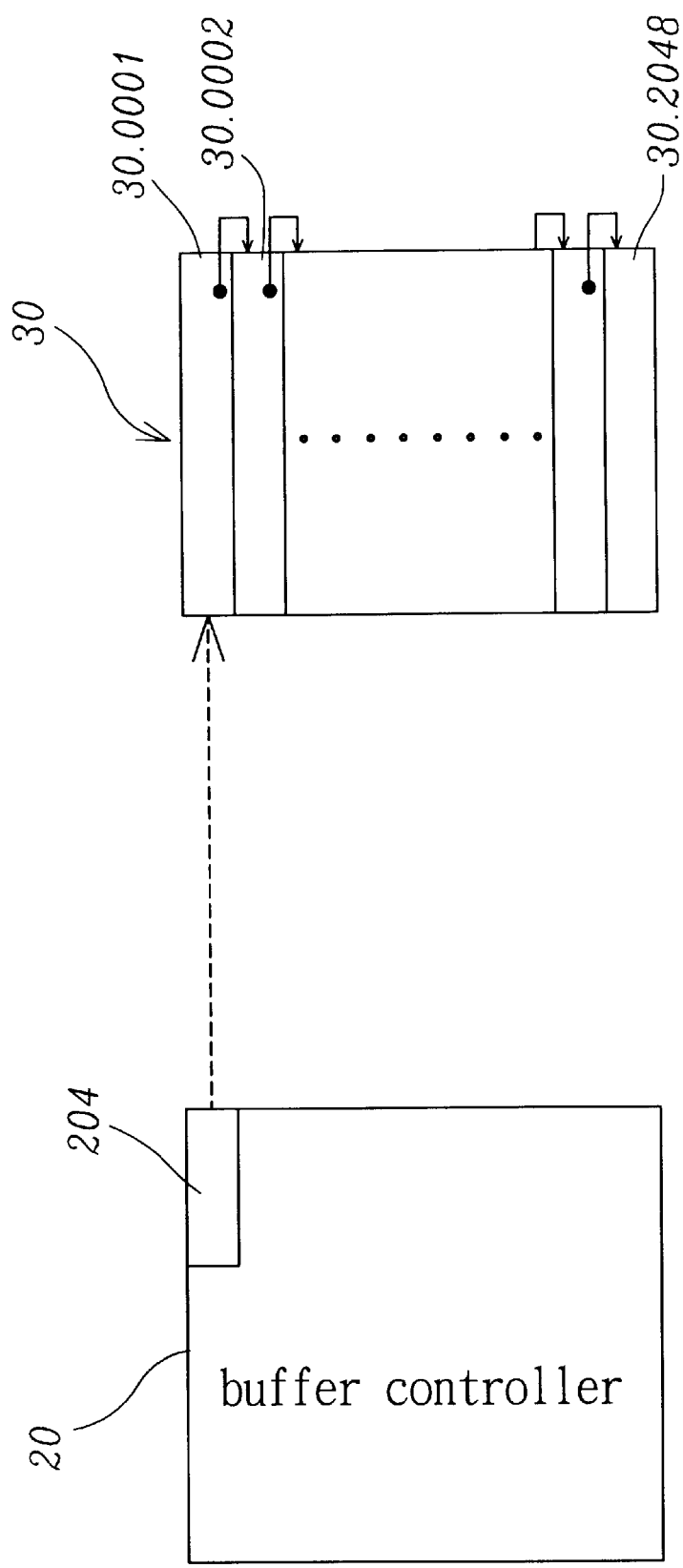
FIG. 3 is a conventional schematic view showing the buffer management using a linked list.
Figure 4:
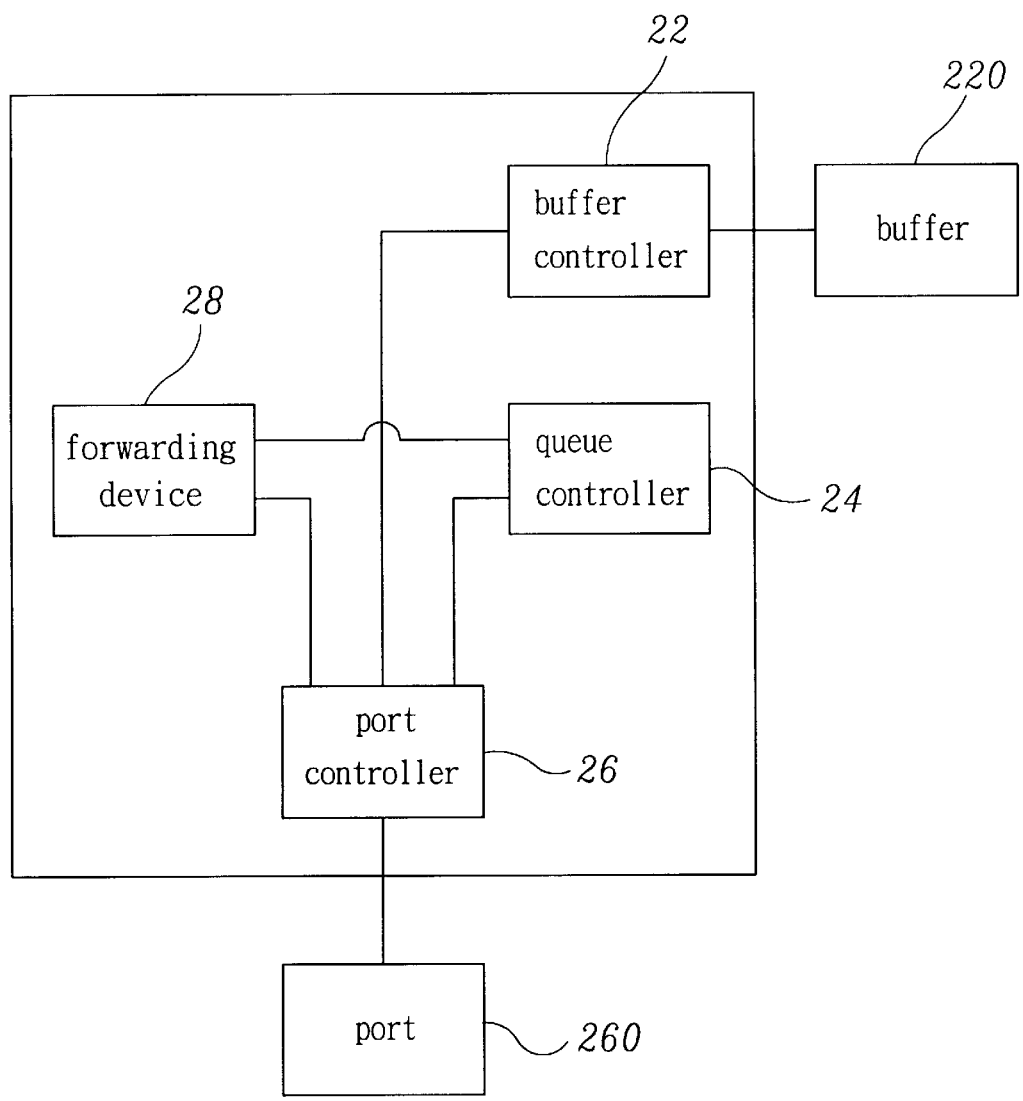
FIG. 4 is a block diagram of the switch controller in a preferred embodiment of the present invention.

With reference to FIG. 4, a preferred embodiment of a block diagram of a switch controller of the present invention is illustrated. The switch controller includes a plurality of port controllers 26 each coupled to one of a plurality of ports 260 for transceiving packets. The port controller 26 is also coupled to a queue controller 24, a buffer controller 22, and a forwarding device 28. The queue controller 24 is also coupled to the forwarding device 28. A packet is transceived by the switch controller through the queue controller 24 and the port controller 26. A received packet is enqueued by the queue controller 24 through the port controller 26 and requests allocating a memory buffer from the buffer controller 22. Then, it is buffered to the buffer memory 32. The forwarding device 28 looks up a hash table and then forwards the packet accordingly.

Figure 5:
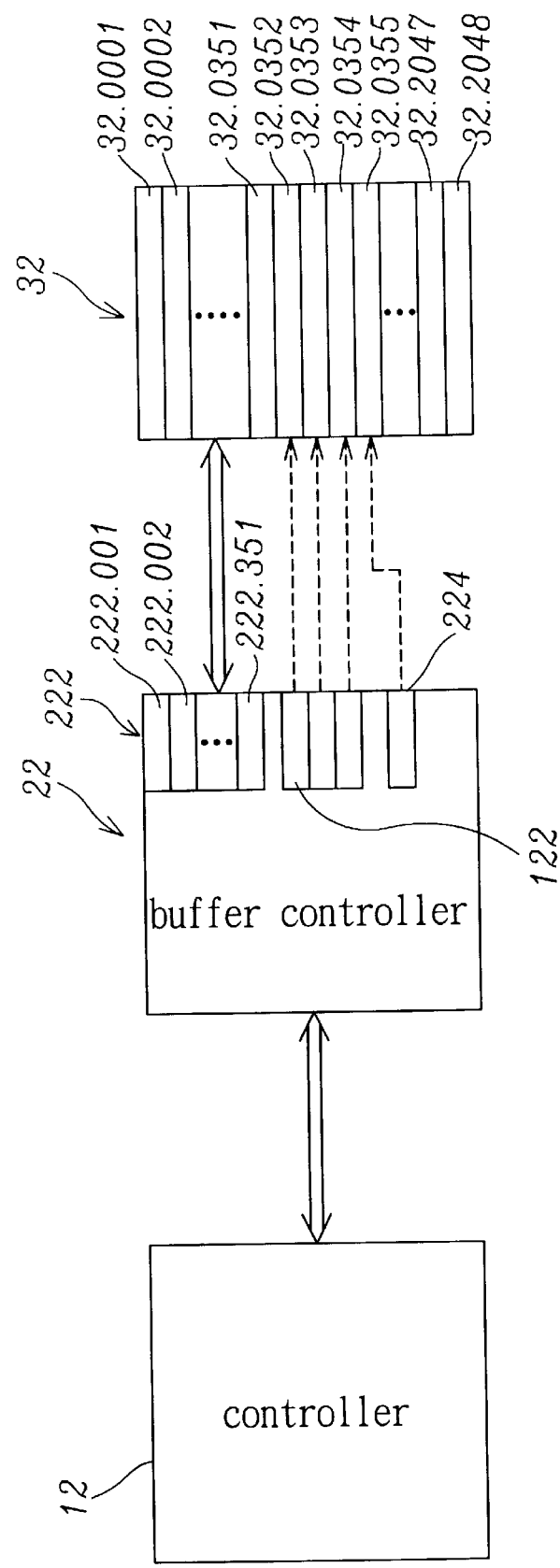
FIG. 5 is a schematic view showing the buffer management according to a preferred embodiment of the present invention.
Figure 6:
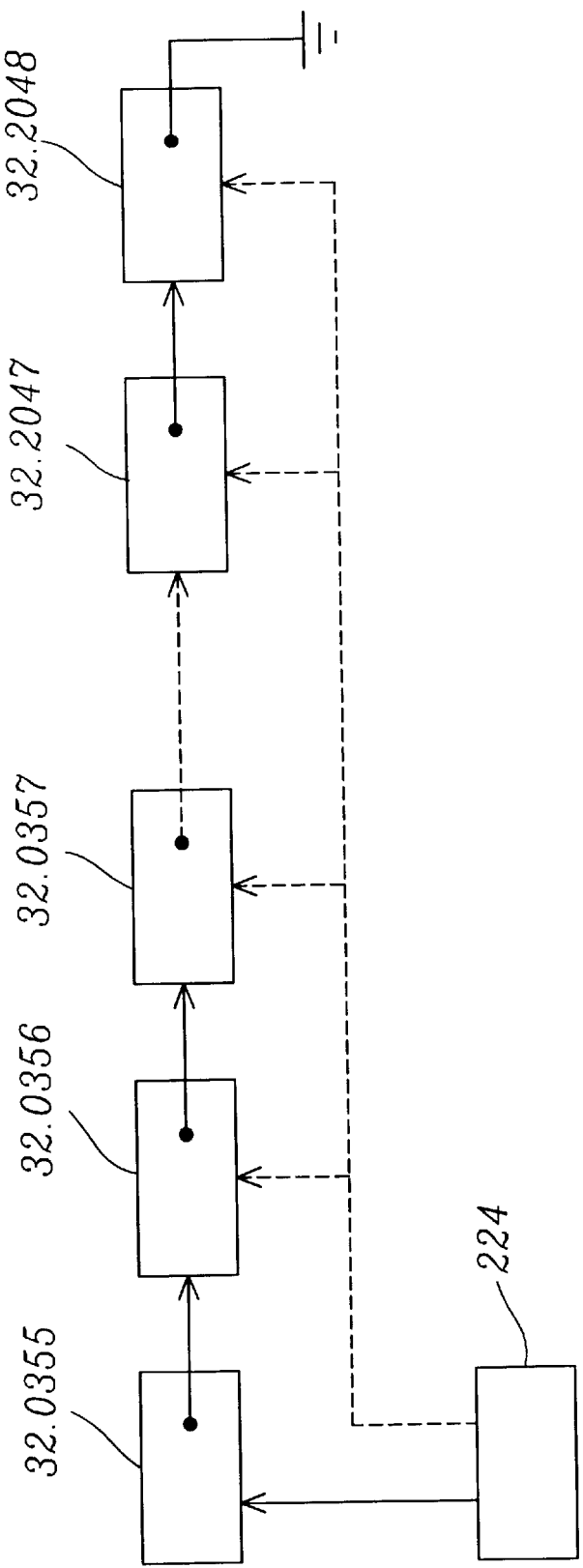
FIG. 6 is an exemplary schematic diagram of the linked list in a preferred embodiment of the present invention.

FIG. 5 shows a preferred embodiment of buffer management according to the present invention. The buffer controller 22 manages the buffer memory 32 by integrating a plurality of bit mask bits 222 and a linked list pointer 224, in addition three address cache units 122 are provided to further enhance the performance of the controller for buffer management. At the initialization stage, the bit masker 222 includes a plurality of mask bits 222.001 to 222.351 for recording the utilization status of the segments 32.0001 to 32.0351 (or it can be defined as a bit mask region) of the buffer memory 32, i.e. the plurality of bits 222.001 to 222.351 of the bit masker 222 respectively correspond to the utilization status of the segments 32.0001 to 32.0351 of the buffer memory 32. The three address cache units 122 store the addresses of the segments 32.0352 to 32.0354 of the buffer memory 32. Therefore, the controller 12 can real-time process data of the memory out of the bit mask region. The segments 32.0355 to 32.2048 of the buffer memory 32 are serially linked, namely, the segment 32.0355 is linked to the segment 32.0356, and in this way, finally the sequence is serially linked to the segment 32.2048. A pointer 224 always points to a first unused segment address of the linked list, as shown in FIG. 6. The buffer controller 22 controls the pointer 224 to always point to the first unused segment, i.e. the head, of the linked list. If the controller 12 is desired to use the segment 32.0355 for data processing, the pointer 224 will point to the next unused segment, i.e., the segment 32.0356. Therefore, above three mentioned control modes are used to manage the buffer memory 32 so as to improve the operation efficiency and the cost of the hardware can be reduced greatly.

The buffer memory 32 can be a static random access memory (SRAM) or a dynamic random access memory (DRAM) according to the given design requirements.

With reference to FIG. 5, in the case of a switch controller, in general, the buffer memory 32 allocates memory by the unit of the segment. The size of each segment can be defined by various applications. In a preferred embodiment of the present invention, it may program that the total size of the segments 32.0001 to 32.0351 of the buffer memory 32 are slightly larger than two times of the maximum Ethernet packet length received by each port. In general, the maximum Ethernet packet has a byte length of 1518 or has a super byte length of 2048. Assume that there are totally 11 ports, the size of segments 32.0001 to 32.0351 is preferably larger than 1518*28*11 or 2048*2*11. The advantage is that when a port, for example, receives maximum Ethernet packets continuously, no congestion occurs. The reasons lies in that each port can receive a maximum Ethernet packet to be switched to a different port and thus request allocating half of the segments 32.0001 to 32.0351 by bit mask very quickly. When the port continues receiving another maximum Ethernet packet, rest of the free segments 32.0001 to 32.0351 can be similarly allocated therefore. Meanwhile, since previous Ethernet packets have been forwarded, originally occupied memory is freed to the system. Therefore, when continuously incoming maximum Ethernet packets, the memory can be allocated by bit mask quickly. Particularly, the switch controller may program the segments 32.0001 to 32.0351 as the private buffers for the 11 ports. With the aforesaid programming, each port always privately owns a private buffer larger than two times of the maximum Ethernet packet length. Therefore, a minimum utilization of the 11 ports is ensured.

The above structure benefits a ping-pong test about the performance of a network switch. Namely, since the private segments 32.0001 to 32.0351 of the buffer memory are provided, the buffer memory 22 is capable of processing the maximum Ethernet packet continuously by bit mask for improving the whole efficiency.

The advantage of three address cache units 122 will be described in the following. In this design, any three segment addresses can be cached for the linked list so as to effectively improving the linked list structure. When the segments 32.0001 to 32.0351 are exhausted, the content in the address cache units 122 has the top priority for memory allocation. While the allocated memory is processed, the address(es) of the processed memory will be freed to cache address units at the top priority. For example, the buffer is allocated and freed by the address cache units in the stack structure. Therefore, the complex hardware operation is significantly improved as the links of a linked list is changed. For example, with different port rates, such as a 100 Mbyte input port and a 10 Mbyte output port, the segments 32.0001 to 32.0351 of the buffer memory will exhaust quickly. The addresses cached in the address cache units 122 have the top priority to be retrieved, so as to reduce the heavy load of the linked list structure.

In summary, the present invention provides a buffer management method. The method comprises the following steps. A first control mode is performed, wherein a plurality of bits are used to control a bit mask region of a memory. A second control mode is performed, wherein a plurality of unused addresses in a link region of the memory is cached. A third control mode is performed, wherein a linked list is used to control a plurality of second unused addresses in the link region of the memory. The present invention further provides a controller comprising a plurality of bits for controlling a utilization of a bit mask region; a plurality of address cache units for caching a plurality of first unused address in the link region; and a pointer for pointing to a head of a linked list in a link region of the memory, and the linked list is a list linked with a plurality of second unused addresses. The present invention also provides an switch controller for increasing efficiency in buffer management. The switch controller according to the present invention comprises: a plurality of ports for transceiving a plurality of packets; a plurality of port controller being coupled to the ports, thereby the port controller requesting enqueuing for packets; a forwarding device being coupled to the port controller for transferring packets; a memory programming with a bit mask region and a link region; and a buffer memory being coupled to the memory; and a buffer controller including a plurality of bits and a pointer for requesting a memory allocation for buffering the packets; wherein the plurality of bits representing the usage status of the bit mask region and the pointer pointing to a head of a linked list in a link region of the memory; and the linked list being linking to a plurality of first unused addresses.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A buffer management method comprising the steps of:
   executing a first control mode for controlling a bit mask region of a memory device by bit mask; and executing a second control mode for controlling a link region of said memory device by a linked list, said link region being at least partially offset from said bit mask region.

2. The buffer management method as claimed in claim 1, wherein said bit mask region of said memory device is larger than two times a predetermined maximum packet byte length for data to be stored in said memory device.

3. The buffer management method as claimed in claim 1, wherein said step of executing a second control mode comprises a step of recording a first unused address in said link region of said memory device by a pointer.

4. The buffer management method as claimed in claim 1, wherein said memory device is a static random access memory.

5. A buffer management method comprising the steps of:
    executing a first control mode for controlling a bit mask region of a memory device by a plurality of bits;
    executing a second control mode for caching a plurality of first unused addresses in a link region in said memory device; and
    executing a third control mode for controlling a plurality of second unused addresses in said link region of said memory device by a linked list, said link region being at least partially offset from said bit mask region.

6. The buffer management method as claimed in claim 5, wherein said bit mask region of said memory device has a length larger than two times a predetermined maximum packet byte length for data to be stored in said memory device.

7. The buffer management method as claimed in claim 5, wherein said step of executing a third control mode comprises a step of pointing to a head of said second unused addresses in said link region of said memory device by utilizing a pointer.

8. The buffer management method as claimed in claim 5, wherein said memory device is a static random access memory.

9. A controller comprising:
    a plurality of bits for controlling a bit mask region of a memory device; and
    a pointer for pointing to a head of a linked list in a link region of said memory device, wherein said linked list is a list linking a plurality of unused addresses, said link region being at least partially offset from said bit mask region.

10. The controller as claimed in claim 9, wherein said bit mask region of said memory device has a length larger than two times a predetermined maximum packet byte length for data to be stored in said memory device.

11. The controller as claimed in claim 9, wherein said memory device is a static random access memory.

12. The controller as claimed in claim 9, wherein said memory device is a dynamic random access memory.

13. The controller as claimed in claim 9, wherein said bit mask region comprises a plurality of segments and said link region comprises a plurality of segments.

14. A controller comprising:
    a plurality of bits for controlling a bit mask region of a memory device;
    a plurality of cache units for caching a plurality of first unused addresses in a link region of said memory device; and
    a pointer for pointing to a head of a linked list in said link region of said memory device, wherein said linked list is a list linked by a plurality of second unused addresses, said link region being at least partially offset from said bit mask region.

15. The controller as claimed in claim 14, wherein said bit mask region of said memory device is larger than two times a predetermined maximum packet byte length for data to be stored in said memory device.

16. The controller as claimed in claim 14, wherein said memory device is a static random access memory.

17. The controller as claimed in claim 14, wherein said memory device is a dynamic random access memory.

18. The controller as claimed in claim 14, wherein the bit mask region comprises a plurality of segments and said link region comprises a plurality of segments.

19. The controller as claimed in claim 14, wherein said controller is a switch controller.

* * * * *